United States Patent
Momcilovich et al.

(10) Patent No.: US 9,683,400 B2
(45) Date of Patent: Jun. 20, 2017

(54) VEHICLE WINDOW MANAGEMENT

(71) Applicant: Ford Global Technologies, LLC, Dearborn, MI (US)

(72) Inventors: Paul Theodore Momcilovich, Tecumseh, MI (US); Mark Allan Lippman, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/934,670

(22) Filed: Nov. 6, 2015

(65) Prior Publication Data
US 2017/0130508 A1    May 11, 2017

(51) Int. Cl.
| | | |
|---|---|---|
| B60R 22/00 | (2006.01) | |
| E05F 15/00 | (2015.01) | |
| G05D 1/00 | (2006.01) | |
| G05D 3/00 | (2006.01) | |
| G06F 7/00 | (2006.01) | |
| G06F 17/00 | (2006.01) | |
| E05F 15/71 | (2015.01) | |
| B60J 1/20 | (2006.01) | |
| E05F 15/77 | (2015.01) | |
| G01W 1/10 | (2006.01) | |

(52) U.S. Cl.
CPC .............. *E05F 15/71* (2015.01); *B60J 1/20* (2013.01); *E05F 15/77* (2015.01); *G01W 1/10* (2013.01); *G01W 2203/00* (2013.01)

(58) Field of Classification Search
CPC .............. E05F 15/77; B60J 1/20; G01W 1/10
USPC ............................................................ 701/49
See application file for complete search history.

(56) References Cited

U.S. PATENT DOCUMENTS

| | | | |
|---|---|---|---|
| 8,952,818 B1* | 2/2015 | Zhang ................ | G08B 21/0446 340/573.1 |
| 2007/0188122 A1* | 8/2007 | Andrejciw .............. | E05F 15/75 318/483 |
| 2008/0106116 A1 | 5/2008 | Boulakia | |
| 2010/0023210 A1 | 1/2010 | Flick | |
| 2011/0118897 A1 | 5/2011 | Menard et al. | |
| 2015/0134207 A1 | 5/2015 | Park | |

FOREIGN PATENT DOCUMENTS

| | | |
|---|---|---|
| CN | 202080220 U | 12/2011 |
| DE | 3704310 A1 | 8/1988 |
| DE | 202005010279 U1 | 11/2005 |

(Continued)

OTHER PUBLICATIONS

"Auto closing rain sensing windows and sunroof on your mk5+ vw", http://www.myturbodiesel.com/wiki/auto-closing-rain-sensing-windows-and-sunroof-on-your-mk5-vw/, 6 pages.

(Continued)

*Primary Examiner* — Maceeh Anwari
(74) *Attorney, Agent, or Firm* — Frank MacKenzie; Bejin Bieneman PLC

(57) ABSTRACT

A vehicle computer is programmed to receive weather data from a remote server, to determine a frequency, based on the weather data, to obtain precipitation data from one or more vehicle sensors. The computer is further programmed to obtain the precipitation data, and to close one or more vehicle windows based at least in part on the precipitation data.

18 Claims, 2 Drawing Sheets

(56) References Cited

FOREIGN PATENT DOCUMENTS

DE   202011004161 U1   9/2011
DE   102016111589 A    1/2017
JP       2010047958 A    3/2010

OTHER PUBLICATIONS

"Automatic Rain Sensing Windows", College of Technology, University of Houston, 18 pages.
GB Search Report, Appl No. GB1618566.2; Mar. 31, 2017; 4 pages.

* cited by examiner

VEHICLE WINDOW MANAGEMENT

BACKGROUND

Vehicle operators may forget to close one or more vehicle windows after departing the vehicle. Ensuing precipitation may damage the interior of the vehicle.

DRAWINGS

DESCRIPTION

Introduction

Figure 1:
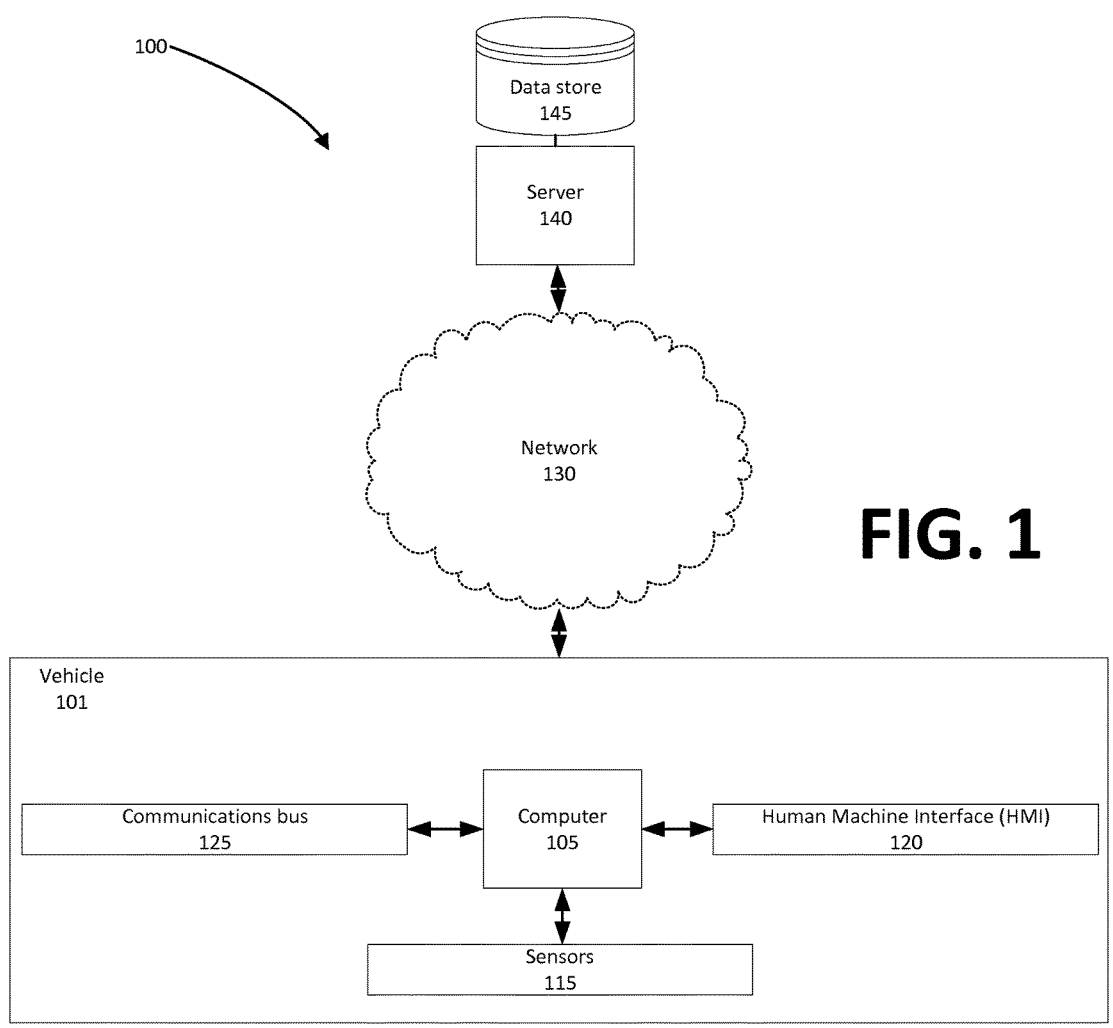
FIG. 1 illustrates an example vehicle system for managing vehicle windows.

FIG. 1 is a block diagram of an example vehicle system. The vehicle 101 may include a computer 105 that includes or is communicatively coupled to a human machine interface (HMI) 120, sensors 115, and/or a communications bus 125, e.g., communicating with various vehicle 101 components such as electronic control units (ECUs) for steering, brakes, powertrain, etc. The computer 105 may communicate with other vehicles using a communications protocol such as is known, e.g., dedicated short range communications (DSRC), etc. The computer 105 may further receive and provide data relating to operating the vehicle 101 via the vehicle communications bus 125, and yet further may communicate via a network 130 with one or more remote servers 140. The server 140 includes or is communicatively coupled to a data store 145.

The vehicle 101 computer 105 may be programmed to actuate movement of, e.g., to close, one or more windows of the vehicle 101, e.g., in a vehicle door, roof, etc. The computer 105 may actuate closing of the one or more windows based on weather data received from at least one of a remote server 140 and at least one of vehicle sensors 115 and/or other surrounding vehicles. For example, the weather data may include data indicating the presence of precipitation.

Advantageously, the computer 105 can be programmed to, based at least in part on the weather data, set a vehicle 101 sensor 115 sampling frequency. For example, received weather data from the server 140 could specify a likelihood of precipitation below a predetermined threshold, e.g., 25%, 50%, etc., then the vehicle 101 sensors 115 may less frequently, e.g., once every ten minutes, once every 15 minutes, etc., obtain data to determine the presence or absence of precipitation. The computer 105 may alternatively or additionally determine set and/or modify sensor 115 sampling frequency based at least in part on data received from one or more surrounding vehicles, data from sensors 115, e.g., indicating ambient light, time of day, vehicle speed, direction, route, location (e.g., in a garage or outdoors), etc. Because sensors 115 can consume significant vehicle 101 resources, especially battery power, vehicle resources are conserved and more efficiently used by setting and/or modifying a sensor 115 sampling frequency to provide measurements to actuate vehicle 101 window movement.

Example System

The vehicle 101 computer 105, which includes a processor and a memory as is known, may be communicatively coupled to, e.g., via a communications bus 125 or other known wired or wireless connections, or the computer 105 may include, one or more electronic control units, e.g., controllers or the like included in the vehicle 101 for monitoring and/or controlling various vehicle 101 components, e.g., an engine control unit (ECU), transmission control unit (TCU), etc. The bus 125 may be a controller area network (CAN) bus and/or any other suitable in-vehicle communications bus such as JASPAR, LIN, SAE J1850, AUTOSAR, MOST, etc. Electronic control units may be connected to, e.g., the CAN bus, as is known. The vehicle 101 may also include one or more electronic control units that for receive and transmit diagnostic information such as an onboard diagnostics (OBD-II) information. Via the CAN bus, OBD-II, and/or other wired or wireless mechanisms, the computer 105 may transmit messages to various devices in the vehicle 101 and/or receive messages from the various devices, e.g., controllers, actuators, etc. Alternatively or additionally, in cases where the computer 105 actually comprises multiple devices, the CAN bus or the like may be used for communications between devices represented as the computer 105 in this disclosure, e.g., various ECUs.

The computer 105 may transmit and/or receive messages using a plurality of communication protocols, e.g., the computer 105 may include and/or be communicatively coupled to one or more transceivers as are known for providing such communications. For example, the computer 105 may transmit and/or receive messages using vehicle-to-vehicle protocols such as Dedicated Short Range Communication (DSRC), cellular modem, and short-range radio frequency.

The computer 105 may further communicate with a network 130 that extends outside of the vehicle 101, e.g., communicating with the server 140. The network 130 may include various wired and/or wireless networking technologies, e.g., cellular, Bluetooth, wired and/or wireless packets, etc. The network 130 may have any suitable topology. Example communication networks include wireless communication networks (e.g., using Bluetooth, IEEE 802.11, etc.), local area networks (LAN), and/or wide area networks (WAN), including the Internet, providing data communication services.

The vehicle 101 may include a variety of sensors 115. The sensors 115 may be linked to electronic control units and operate within a CAN bus protocol or any other suitable protocol, as described above. The sensors 115 typically may both transmit and receive data such as measurements, commands, etc. The sensors 115 may communicate with the computer 105 or other electronic control unit via e.g., the CAN bus protocol, to process information transmitted from or received by the sensors 115. The sensors 115 may communicate with the computer 105 or other electronic control unit via any suitable wireless and/or wired manner. The sensors 115 may include, by way of example and not limitation, any assortment of a camera, a RADAR unit, a LADAR (also known as LIDAR) unit, a sonar unit, a motion detector, etc. The sensors 115 may use known techniques to detect the presence and/or measure one or more characteristics of precipitations, e.g., precipitation type, precipitation intensity, precipitation accumulation, snow water equivalent (SWE), etc. Additionally, the sensors 115 may include a global positioning system (GPS) receiver that may communicate with a global positioning system satellite.

The vehicle 101 may include a human machine interface (HMI) 120. The HMI 120 may allow an operator of the vehicle 101 to interface with the computer 105, with electronic control units, etc. The HMI 120 may include any one of a variety of computing devices including a processor and a memory, as well as communications capabilities. The HMI 120 may be a portable computer, tablet computer, mobile phone, e.g., a smart phone, etc., that includes capabilities for wireless communications using IEEE 802.11, Bluetooth, and/or cellular communications protocols, etc. The HMI 120 may further include interactive voice response (IVR) and/or a graphical user interface (GUI), including e.g., a touchscreen or the like, etc. The HMI 120 may communicate with the network 130 that extends outside of the vehicle 101 and may communicate directly with the computer 105, e.g., using Bluetooth, etc.

The server 140 may include or be communicatively coupled to a data store 145. Data received from the computer 105 and/or the server 140 may be stored in the data store 145 for later retrieval.

Example Process

Figure 2:
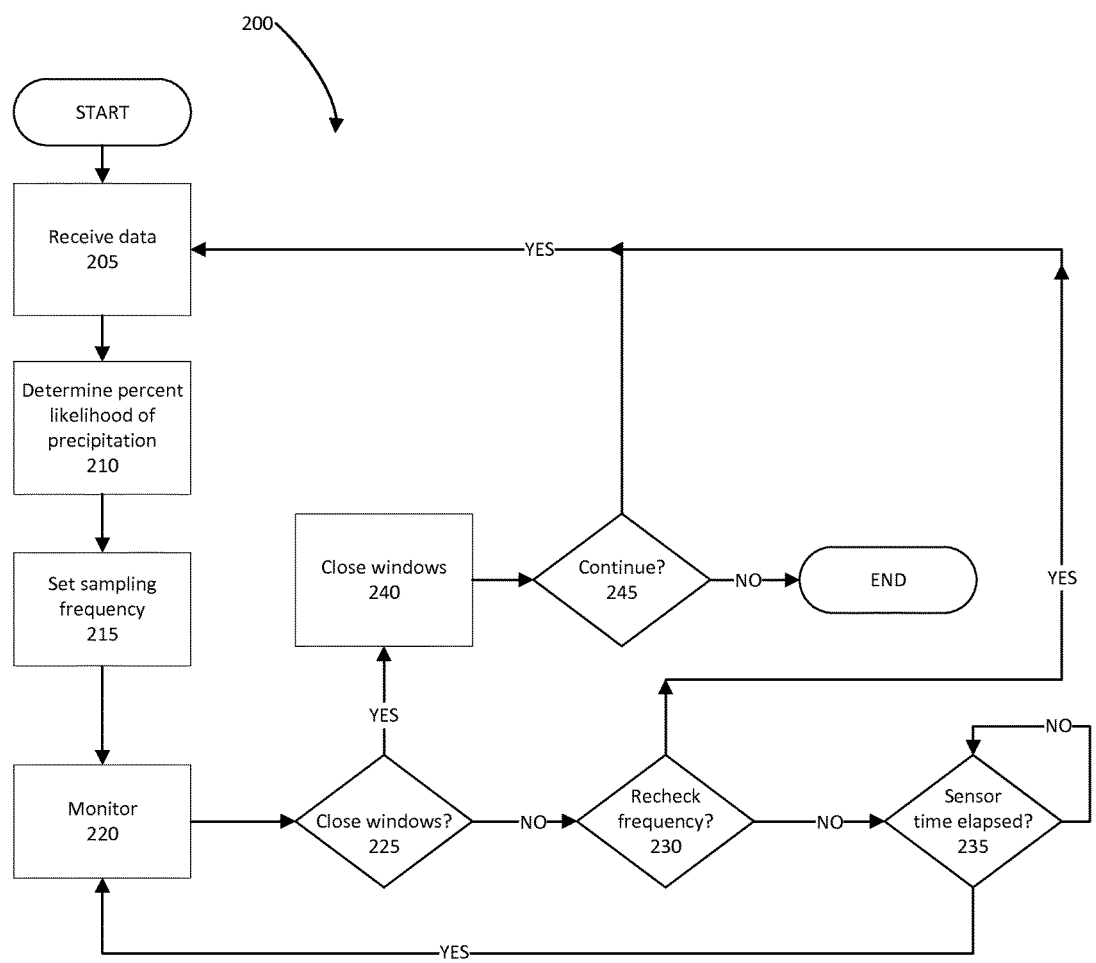
FIG. 2 is a diagram of an example process for managing vehicle windows.

FIG. 2 is a diagram of an example process 200 for automatically closing vehicle windows. The example process 200 may be performed in the vehicle 101 computer 105. Various prerequisites may be provided that must be satisfied before the process 200 is commenced. For example, the vehicle 101 may be required to be parked with the ignition off, devoid of any human users, and/or having at least one vehicle 101 window open, as conditions to beginning the process 200.

The process 200 begins in a block 205, in which the computer 105 receives data from the server 140. The data received from the server 140 includes weather data, e.g., weather forecasts such as a percentage likelihood of precipitation at one or more future times, e.g., over the next hour, next two hours, next four hours, etc., an actual humidity, a predicted humidity at one or more future times, a dew point temperature and/or time at which such temperature is predicted to be reached, measurements of current conditions from nearby weather sensors (weather stations), etc. Additionally, surrounding vehicles may send messages to the vehicle 101 indicating if the surrounding vehicles are experiencing precipitation.

Next, in a block 210, the vehicle 101 computer 105 determines a percent likelihood of precipitation, e.g., rain, snow, hail, etc. As mentioned above, data received from the server 140 may include a percent likelihood of precipitation. Alternatively or additionally, the computer 105 may determine the percent likelihood of precipitation based at least in part on the received data, e.g., and on sensor 115 measurements, etc. For example, a barometric pressure in combination with an ambient temperature, detected wind speed, and/or ambient humidity could be associate with a percent likelihood of precipitation and/or sampling frequencies (described further in the next paragraph).

Next, in a block 215, the computer 105 establishes or, if the block 215 is being executed in a second or subsequent iteration of the process 200, modifies a sensor 115 sampling frequency. The sensor 115 sampling frequency specifies how often the sensors 115 make measurements to determine whether precipitation is falling upon the vehicle 101. For example, the sensors 115 would measure the environment more often with a high sensor 115 sampling frequency than the sensors 115 would measure the environment with a low sensor 115 sampling frequency.

The vehicle 101 computer 105 determines the vehicle sensor 115 sampling frequency based at least in part on the retrieved percent likelihood of precipitation and/or on other received data, e.g., the computer 105 could store a table or the like indicating threshold percentages and/or a threshold temperature, humidity, and/or wind speed which, if each are met or exceeded, indicate a predetermined likelihood of precipitation, i.e., a likelihood determined so as to be associated with a predetermined sampling frequency. For example, the computer 105 may set a first sensor 115 sampling frequency for a percent likelihood of precipitation of 90% or higher and a second sensor 115 sampling frequency lower than the first sensor 115 sampling frequency for a lower percent likelihood of precipitation, e.g., less than 90%. At even lower threshold likelihoods of precipitation, e.g., less than fifty percent, less than twenty-five percent, etc., even lower respective sampling frequencies could be set. Further, for example, a humidity above 80 percent combined with a wind speed of over ten miles per hour could be associated with a 90 percent or higher chance of precipitation so as to cause the computer 105 to establish the higher sampling frequency. Yet further, threshold to which a percentage likelihood of precipitation is compared to determine the sampling frequency can be adjusted according to a type of precipitation ("type as used herein including an intensity of precipitation), e.g., a possibility of "driving rain" could result in a lower threshold that a possibility of "misting rain," and "hail" could result in an even lower threshold.

Further, although not shown in FIG. 2 to maintain a clarity of illustration, in some implementation it is possible that the computer could be programmed to proceed from the block 210 to a block 225, in which windows are closed, if the percent likelihood of precipitation at a current time or within a predetermined future period of time, e.g., the next hour, exceeds a predetermined threshold, e.g., ninety percent.

As described above, by modifying the sensor 115 sampling frequency, the vehicle 101 is able to optimize vehicle 101 power consumption to conditions, e.g., use less sensor 115 power when a likelihood of precipitation is low and therefore sampling can be less often, but use more power when needed because sensor 115 data and/or a likelihood of precipitation indicate that more frequent sampling is warranted. Advantageously, the vehicle 101 the process 200 can optimize the amount of power available for other vehicle 101 operations.

Next, in a block 220, after the vehicle 101 computer 105 has established or modified the vehicle 101 sensor 115 sampling frequency, or after a sampling period has passed following one of the blocks 230, 235 described below, the computer 105 receives data from one or more sensors 115 indicating a presence or absence of precipitation, e.g., sensors 115 could include rain sensors such as is known.

Next, in a block 225, the computer 105 determines whether data from one or more sensors 115 indicates a presence of precipitation. If precipitation is detected, a block 240 is executed next. If precipitation is not detected, then a block 230 is executed next.

In the block 230, the computer 105 determines whether to re-check the sampling frequency. For example, the computer 105 could be programmed to receive data form the server 140 indicating a change in weather data, e.g., a change in a likelihood of precipitation. Alternatively or additionally, the computer 105 could be programmed to periodically, e.g., once every half hour, query the server 140 for weather data and/or perform other checks to determine whether a change in likelihood of precipitation has changed. If the computer 105 determines to re-check the sampling, then the process 200 returns to the block 205. Otherwise, the process 200 proceeds to a block 235.

In the block 235, the computer 105 determines whether the sampling period has elapsed, i.e., according to the sensor 115 sampling frequency established as described above. If not, the process 200 remains in the block 235. If the sampling period has elapsed, then the process 200 returns to the block 220 to perform monitoring, as described above.

In the block 240, which may follow the block 225 as described above, the computer 105 actuates mechanisms such as are known, e.g., motors or the like, to close the vehicle 101 windows. Following the block 240, a block 245 is executed next.

In the block 245 the vehicle 101 computer 105 determines if the process 200 should continue. For example, the process 200 may end if the operator of the vehicle 101 ends the process 200, if vehicle 101 battery power is below a predetermined threshold, or is disconnected or switched off, etc. In any case, if the process 200 should not continue, the process 200 ends following the block 245. Otherwise, the process 200 returns to the block 205. Note that the process 200 could continue to execute after closing the vehicle 101 windows in the block 235. For example, the computer 105 could continue to monitor precipitation conditions and/or adjust a sampling frequency, and could re-open windows upon detecting that precipitation has ceased.

CONCLUSION

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   receiving, in a vehicle computer, weather data from a remote server;
   determining a frequency, based on the weather data, to obtain precipitation data from one or more vehicle sensors;
   obtaining the precipitation data according to the frequency; and
   actuating closing of one or more vehicle windows based at least in part on the precipitation data.

2. The method of claim 1, further comprising receiving second weather data and modifying the frequency based on the second weather data.

3. The method of claim 1, further comprising determining that at least one vehicle window is open prior to determining to close one or more vehicle windows.

4. The method of claim 1, further comprising determining that the vehicle is in a parked state prior to determining to close one or more vehicle windows.

5. The method of claim 1, further comprising determining that no users are present in the vehicle prior to determining to close one or more vehicle windows.

6. The method of claim 1, further comprising determining the frequency based at least in part on the weather data including a percent chance of precipitation above a predetermined threshold.

7. The method of claim 1, further comprising determining the frequency based at least in part on a type of weather event included in the weather data.

8. The method of claim 1, further comprising obtaining additional precipitation data, and actuating opening of at least one vehicle window based on the additional precipitation data.

9. The method of claim 1, further comprising obtaining additional weather data, and adjusting the frequency based on the additional weather data.

10. A system, comprising:
    a vehicle computer comprising a processor and a memory, the memory storing instructions executable by the process to:
    receive weather data from a remote server communicatively coupled to the vehicle computer;
    determine a frequency, based on the weather data, to obtain precipitation data from one or more vehicle sensors communicatively coupled to the vehicle computer;
    obtain the precipitation data according to the frequency; and actuate closing of one or more vehicle windows based at least in part on the precipitation data.

11. The system of claim 10, wherein the computer is further programmed to receive second weather data and modify the frequency based on the second weather data.

12. The system of claim 10, wherein the computer is further programmed to determine that at least one vehicle window is open prior to determining to close one or more vehicle windows.

13. The system of claim 10, wherein the computer is further programmed to determine that the vehicle is in a parked state prior to determining to close one or more vehicle windows.

14. The system of claim 10, wherein the computer is further programmed to determine that no users are present in the vehicle prior to determining to close one or more vehicle windows.

15. The system of claim 10, wherein the computer is further programmed to determine the frequency based at least in part on the weather data including a percent chance of precipitation above a predetermined threshold.

16. The system of claim 10, wherein the computer is further programmed to determine the frequency based at least in part on a type of weather event included in the weather data.

17. The system of claim 10, wherein the computer is further programmed to obtain additional precipitation data, and to actuate opening of at least one vehicle window based on the additional precipitation data.

18. The system of claim 10, wherein the computer is further programmed to obtain additional weather data, and to adjust the frequency based on the additional weather data.

* * * * *